(12) United States Patent
Doubler et al.

(10) Patent No.: US 7,658,582 B2
(45) Date of Patent: *Feb. 9, 2010

(54) PRECISE LINEAR FASTENER SYSTEM AND METHOD FOR USE

(75) Inventors: Robert L. Doubler, Ida, MI (US); John E. Hammill, Sr., Rossford, OH (US)

(73) Assignee: Ortho Innovations, LLC, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/618,689

(22) Filed: Jul. 9, 2003

(65) Prior Publication Data

US 2005/0008448 A1 Jan. 13, 2005

(51) Int. Cl.
*F16B 39/36* (2006.01)
(52) U.S. Cl. .................. 411/433; 411/549; 411/353; 411/550; 411/554
(58) Field of Classification Search ............... 411/353, 411/342, 346, 349, 549, 554, 359, 26, 267, 411/270, 433, 29; 29/525.02, 525.11
See application file for complete search history.

(56) References Cited

U.S. PATENT DOCUMENTS

| | | | |
|---|---|---|---|
| 255,428 A | 3/1882 | Graham | |
| 590,294 A * | 9/1897 | Archer | 411/268 |
| 2,531,049 A * | 11/1950 | Huck | 411/361 |
| 2,978,946 A * | 4/1961 | Looker | 411/361 |
| 3,618,135 A * | 11/1971 | Weller | 333/232 |
| 3,792,933 A * | 2/1974 | Stencel | 403/19 |
| 4,378,187 A | 3/1983 | Fullerton | |
| 4,419,026 A | 12/1983 | Leto | |
| 4,437,805 A * | 3/1984 | Smith | 411/361 |
| 4,573,844 A * | 3/1986 | Smith | 411/340 |
| 4,653,969 A * | 3/1987 | Summerlin et al. | 411/361 |
| 4,684,284 A * | 8/1987 | Bradley, Jr. | 403/320 |
| 4,737,059 A * | 4/1988 | Batten | 411/437 |
| 4,822,223 A * | 4/1989 | Williams | 411/82 |
| 4,836,196 A | 6/1989 | Park et al. | |

(Continued)

FOREIGN PATENT DOCUMENTS

DE 197 20 782 A 1 11/1998

(Continued)

OTHER PUBLICATIONS

Centerpulse Spine-Tech, Inc.; Optima Spinal Fixation System "Surgical Technique"; published 2003.

(Continued)

*Primary Examiner*—Victor Batson
*Assistant Examiner*—David C Reese
(74) *Attorney, Agent, or Firm*—McHale & Slavin, P.A.

(57) ABSTRACT

The present invention provides a linear fastening system capable of rapid engagement and disengagement. More specifically, the system utilizes a cooperating collet member and a compression ring member which are constructed and arranged to slip easily over a shank member. The fastener system is secured by linearly traversing a compression member in an overlapping fashion over the collet member thereby utilizing ribbed surfaces to compress the collet member to grip the outer surface of the shank member. In this manner, the linear fastener system is capable of providing a precise, secure, and reproducible connection between multiple components without the need to apply rotational torque to the assembly.

28 Claims, 9 Drawing Sheets

U.S. PATENT DOCUMENTS

| | | | |
|---|---|---|---|
| 4,854,304 A | 8/1989 | Zielke | |
| 4,887,595 A | 12/1989 | Heinig et al. | |
| 4,887,596 A | 12/1989 | Sherman | |
| 4,946,458 A | 8/1990 | Harms et al. | |
| 4,950,269 A | 8/1990 | Gaines, Jr. | |
| 5,002,542 A | 3/1991 | Frigg | |
| 5,110,244 A * | 5/1992 | Garman | 411/361 |
| 5,129,900 A | 7/1992 | Asher et al. | |
| 5,133,717 A | 7/1992 | Chopin | |
| 5,261,913 A | 11/1993 | Marnay | |
| 5,312,405 A | 5/1994 | Korotko et al. | |
| 5,315,755 A * | 5/1994 | Fulbright et al. | 29/715 |
| 5,324,150 A | 6/1994 | Fullerton | |
| 5,377,395 A * | 1/1995 | Maier et al. | 27/2 |
| 5,427,488 A | 6/1995 | Fullerton et al. | |
| 5,443,467 A * | 8/1995 | Biedermann et al. | 606/65 |
| 5,487,744 A | 1/1996 | Howland | |
| 5,520,689 A | 5/1996 | Schlapfer et al. | |
| 5,545,165 A * | 8/1996 | Biedermann et al. | 606/61 |
| 5,549,608 A | 8/1996 | Errico et al. | |
| 5,569,247 A | 10/1996 | Morrison | |
| 5,591,166 A | 1/1997 | Bernhardt et al. | |
| 5,613,816 A * | 3/1997 | Cabahug | 411/433 |
| 5,613,968 A | 3/1997 | Lin | |
| 5,628,740 A | 5/1997 | Mullane | |
| 5,653,765 A | 8/1997 | McTghe et al. | |
| 5,667,508 A | 9/1997 | Errico et al. | |
| 5,683,390 A | 11/1997 | Metz-Stavenhagen et al. | |
| 5,692,865 A * | 12/1997 | Pratt | 411/55 |
| 5,716,357 A | 2/1998 | Rogozinski | |
| 5,725,527 A * | 3/1998 | Biedermann et al. | 606/61 |
| 5,733,084 A * | 3/1998 | Fullerton | 411/267 |
| 5,733,286 A | 3/1998 | Errico et al. | |
| 5,749,690 A * | 5/1998 | Kutz | 411/431 |
| 5,788,443 A * | 8/1998 | Cabahug | 411/385 |
| 5,800,108 A * | 9/1998 | Cabahug | 411/433 |
| 5,800,435 A | 9/1998 | Errico et al. | |
| 5,816,761 A * | 10/1998 | Cassatt et al. | 411/34 |
| 5,879,350 A | 3/1999 | Sherman et al. | |
| 5,931,840 A | 8/1999 | Goble et al. | |
| 6,050,997 A | 4/2000 | Mullane | |
| 6,063,090 A | 5/2000 | Schlapfer | |
| 6,074,391 A | 6/2000 | Metz-Stavenhagen et al. | |
| 6,077,262 A | 6/2000 | Schlapfer et al. | |
| 6,090,111 A | 7/2000 | Nichols | |
| 6,102,952 A | 8/2000 | Koshino | |
| 6,162,234 A * | 12/2000 | Freedland et al. | 606/151 |
| 6,179,512 B1 * | 1/2001 | Gibson et al. | 403/374.1 |
| 6,224,598 B1 | 5/2001 | Jackson | |
| RE37,227 E | 6/2001 | Brodbeck | |
| 6,254,602 B1 | 7/2001 | Justis | |
| 6,296,642 B1 | 10/2001 | Morrison et al. | |
| 6,302,888 B1 | 10/2001 | Mellinger et al. | |
| 6,355,040 B1 | 3/2002 | Richelsoph et al. | |
| 6,361,260 B1 * | 3/2002 | Schirrmacher | 411/433 |
| 6,371,957 B1 | 4/2002 | Amrein et al. | |
| 6,440,132 B1 | 8/2002 | Jackson | |
| 6,537,005 B1 * | 3/2003 | Denham | 411/42 |
| 6,565,565 B1 | 5/2003 | Yuan et al. | |
| 6,602,255 B1 | 8/2003 | Campbell et al. | |
| 6,613,050 B1 | 9/2003 | Wagner et al. | |
| 6,623,485 B2 | 9/2003 | Doubler et al. | |
| 6,641,586 B2 * | 11/2003 | Varieur | 606/61 |
| 6,652,526 B1 | 11/2003 | Arafiles | |
| 6,712,544 B2 * | 3/2004 | Kruger et al. | 403/408.1 |
| 6,723,100 B2 * | 4/2004 | Biedermann et al. | 606/73 |
| 6,726,689 B2 | 4/2004 | Jackson | |
| 6,884,244 B1 | 4/2005 | Jackson | |
| 6,896,677 B1 | 5/2005 | Lin | |
| 2002/0114680 A1 * | 8/2002 | Stoewer et al. | 411/361 |
| 2003/0073996 A1 | 4/2003 | Doubler et al. | |
| 2003/0149487 A1 | 8/2003 | Doubler et al. | |
| 2004/0006342 A1 | 1/2004 | Altarac et al. | |
| 2004/0181224 A1 | 9/2004 | Biedermann et al. | |
| 2004/0260283 A1 | 12/2004 | Wu et al. | |

FOREIGN PATENT DOCUMENTS

| | | |
|---|---|---|
| DE | 100 05 386 A 1 | 8/2001 |
| EP | 1 354 563 A2 | 10/2003 |
| WO | 2003043511 A1 | 5/2003 |
| WO | 2004064653 A1 | 8/2004 |

OTHER PUBLICATIONS

Centerpulse Spine-Tech, Inc.; Optima Spinal Fixation System "Product Information - The low-profile, polyaxial pedicle screw system"; published 2003.

Centerpulse Spine-Tech, Inc.; ST360 Spinal Fixation System "Product Information - The flexibility of polyaxial screws and the versatility of lateral connectors in a single system"; published 2003.

Sulzermedica; Spine Care Sulzer Spine-Tech, "Surgical Technique for Posterior Lumbar Fixation"; published 2001.

Sulzermedica; Spine Care Sulzer Spine-Tech, "Silhouette Spinal Fixation System Overview"; published 1999.

* cited by examiner

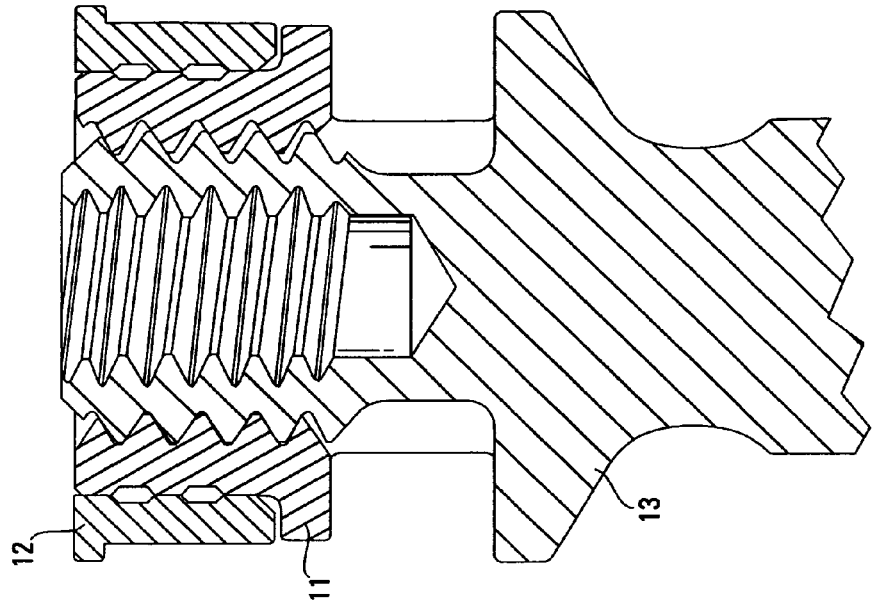
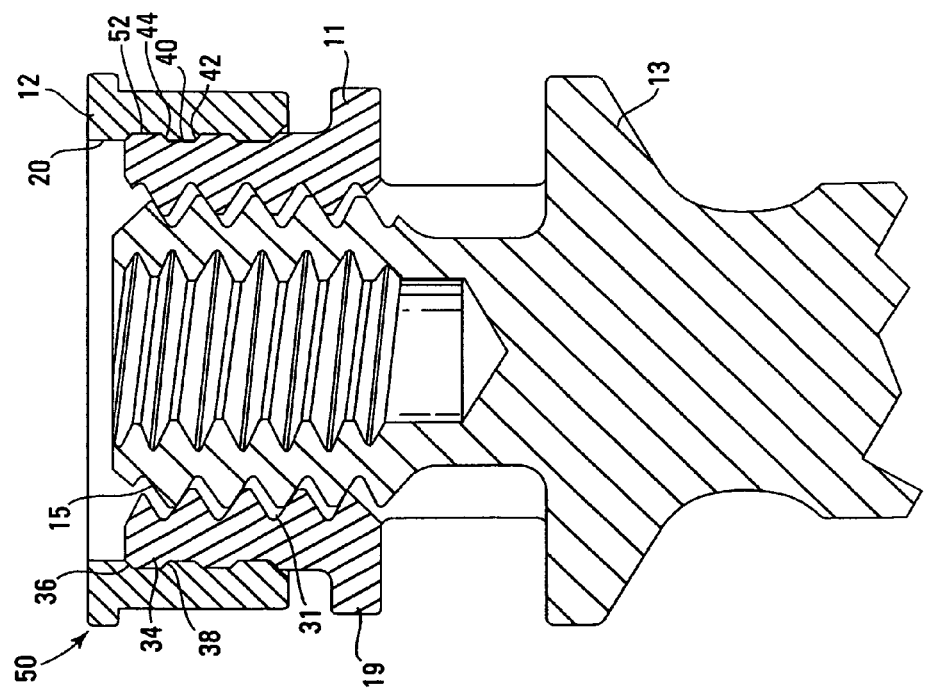

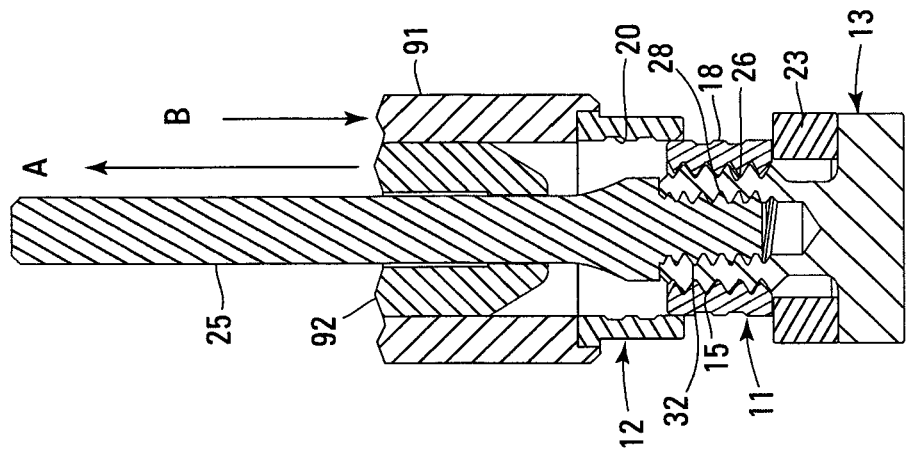
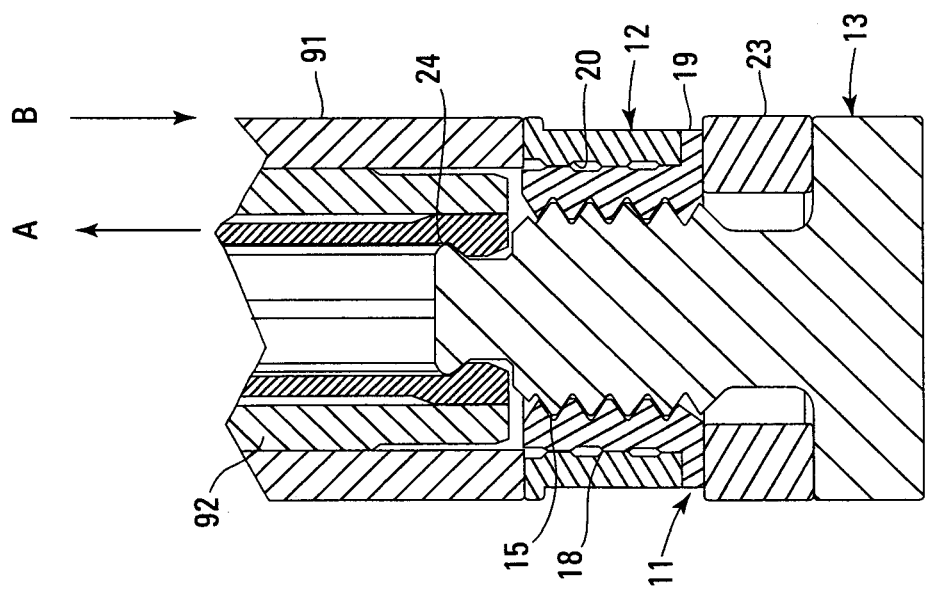

PRECISE LINEAR FASTENER SYSTEM AND METHOD FOR USE

REFERENCE TO RELATED APPLICATIONS

This application is related to patent application Ser. No. 10/661,371, filed Sep. 10, 2003, the contents of which are herein incorporated by reference in their entirety. This application is also related to patent application Ser. No. 10/358,427, filed Feb. 4, 2003, the contents of which are herein incorporated by reference in their entirety.

FIELD OF THE INVENTION

The present invention relates to fasteners capable of rapid linear engagement and disengagement. More specifically, the system utilizes a combination of interlocking sleeve members which combine to form a versatile and effective fastener system which may be used to connect components together without placing torque on the assembly.

BACKGROUND OF THE INVENTION

In general, a fastener is any device used to connect or join two or more components to create an assembly. In the field of manufacturing there are numerous assembly processes requiring individual components to be joined with fasteners to create an assembled product. Most of these processes, requiring fixations of one component in relation to another are currently performed using threaded fasteners for connections. The most common threaded fasteners are referred to by many names, among them: bolts, screws, nuts, studs, lag screws, and set screws.

Since the invention of the threaded fastener, and particularly the bolt and nut combination, various attempts aimed at improving the efficiency of assembling components with threaded fasteners have been made. For this reason, today's product designer has an extraordinary array of choices and possible permutations of known fastening concepts and features. Literally hundreds of types and variations of threaded fasteners are available. Because threaded fastener connections often have a significant impact on assembly cost and product reliability, a great deal of design effort is directed to more efficient designs. Fastener design effort typically involves compromises among considerations such as cost, size, reliability, performance, ease of manufacture, and retrofit capability to existing product designs. While some of these designs improve assembly efficiency, they often result in extremely complex, specialized and expensive fastening components.

In addition to the assembly costs associated with threaded fasteners, the rotational torque required for proper utilization of threaded fasteners is often undesired. When a bolt is used to clamp two parts, the force exerted between the parts is the clamping load. The clamping load is created by exerting a tightening torque on the nut or the head of the screw. These forces keep the threads of the mating parts in intimate contact and decrease the probability of the fastener loosening in service. These forces may damage delicate assemblies, such as electronics and the like. Lock washers, plastic inserts in the nut or bolt, adhesives, cotter pins, locking tabs, etc. are often used to reduce the torque required to prevent a nut and bolt combination from becoming loose during operation. While these devices are generally effective, they add cost and complexity to the assembly operation especially where automated equipment is utilized.

Accordingly, what is lacking in the prior art is a cost effective fastening system capable of linear engagement. The fastener system should achieve objectives such as providing improved manufacturing and assembly efficiency, effective reliable performance, corrosion resistance, and torque-less assembly. The system should include packaging flexibility for installation on various products including retrofitting existing product configurations with minimal modification of the original product.

DESCRIPTION OF THE PRIOR ART

A number of prior art threaded fastening systems exist for attaching components together to form an assembly. Most of the systems, for example bolts and nuts, utilize a combination of internally and externally threaded components to achieve the clamping forces necessary to create the desired assemblies.

It is also known in the prior art to provide various fasteners capable of partial linear and partial rotational engagement. These fasteners generally feature radially inwardly or outwardly biased arcuate segments mounted to engage the threads of a bolt, nut or other threaded member. The threaded segments are generally movably mounted within a casing or around a shaft and resiliently urged inwardly or outwardly. Typically the devices are provided with axially spaced apart radially inwardly directed surfaces of revolution, such as frustoconical surfaces, extending at a common acute angle to the axis of the fastener. In this manner the fasteners and couplings may be secured by merely pushing the threaded components together, thereafter final tightening is accomplished by rotation of the fasteners.

U.S. Pat. No. 5,788,443 to Cabahug discloses a male coupling device featuring movably mounted threaded members which are capable of rapid engagement and disengagement with respect to the stationary threads of a female coupling device. The male coupling device includes a handled shaft having a plurality of threaded segments surrounding the shaft, a sleeve is mounted to move relative to the handle to move the threaded segments inwardly and outwardly to effectively vary the diameter of the assembled threaded elements.

U.S. Pat. No. 5,613,816 to Cabahug discloses an apparatus for rapidly engaging and disengaging threaded coupling members. The complex device includes pin assemblies moveably fitted within adjacent V-shaped segments of the movably mounted externally threaded elements. The device is constructed such that as the coupling members are moved relative to one another the pin assemblies force the threaded elements apart. In addition, ball assemblies are required to maintain proper alignment and locking action of the threaded segments, further adding to the complexity of the device.

U.S. Pat. No. 5,800,108 to Cabahug discloses apparatus for rapidly engaging and disengaging threaded coupling members, which eliminates the ball assemblies of his prior disclosure. The device includes an outer body with a plurality of pull/lock/torque pins extending inwardly to cooperate with oval indentations and apertures extending along the side of the threaded segments. When the sleeve associated with the outer body is moved down, the pins abut the oval indentations to lock the threaded elements in place. As the sleeve is pulled upwardly the pull/lock/torque pins clear a ledge formed on the threaded segments allowing them to move. Continued pulling back of the sleeve allows the pins to pass through apertures and causes the threaded segments to engage a ramp to direct the segments back and away from the bolt member. The construction requires extremely tight machining tolerances to prevent the pins from deflecting to the side and preventing operation of the device. In addition, the amount of torque which can be applied to the threaded segments is limited to that which the pins and the oval indentations can withstand, limiting the device to light duty applications.

U.S. Pat. No. 4,378,187 to Fullerton discloses a quick acting nut assembly. The device consists of a multi-part nut casing having an inclined interior surface adapted for sliding engagement with a threaded jam nut which wedges therein. As the jam nut moves in a first direction along the inclined surface, it compresses radially and the threads of the jam nut engage the threads of the bolt. As the jam nut moves in a second direction along the inclined surface, it may expand radially and disengage from the bolt. When the jam nut is in the engaged position it may be tightened by conventional rotational motion. As the device is tightened the threaded segments increase pressure against the fastener making the task of torquing the fastener to a specified torque difficult. In addition, due to the size of the device, it requires additional space for wrench clearance and the like.

U.S. Pat. Nos. 5,324,150 and 5,427,488 to Fullerton disclose threaded fasteners having a casing that enclose at least three inwardly biased arcuate segments positioned to engage the threads of a bolt. The casing defines spaced apart frustoconical surfaces directed toward the fastener and positioned to engage corresponding surfaces of the segments when the fastener is turned in a first direction. The casing is also provided with a second frustoconical surface for urging the threaded arcuate segments away from the bolt when the fastener is turned in a second direction.

While the prior art devices allow partials linear engagement they require rotational torque to produce the clamping forces required to maintain assemblies. These devices also require extensive machining of thin sections and require difficult assembly processes for manufacture. This combination results in high production cost and weak finished components. Still further, it is well known in the art that cold forming manufacturing techniques result in much stronger and more reliable fasteners. The designs of the prior art devices do not lend themselves to traditional fastener manufacturing techniques, e.g. cold forming, thread rollers, pointers, nut tappers, slotters, shavers etc., adding to the high manufacturing cost and reducing the strength of the fasteners. The present invention teaches a linear fastener system that includes an inner collet member and an outer compressing member that is capable of rapid linear actuated engagement and/or disengagement. In addition, the present invention teaches a linear engaging fastener that is capable of applying precise clamping force to the assembled components without rotating the fastening members. Still further the present invention teaches a fastener system that lends itself to multiple manufacturing techniques.

SUMMARY OF THE INVENTION

The present invention provides a linear fastening system capable of rapid linear engagement and disengagement. More specifically, the system utilizes a interlocking collet member and a compression ring member which are constructed and arranged to slip easily over a shank member while in a first release position. The collet member is constructed and arranged with an inner engaging surface and an outer ribbed compression surface, the compression ring member being constructed and arranged with an inner ribbed compression surface preferably conjugate in shape with respect to the outer surface of the collet member. The fastener system is secured by sliding the compression member in a linear overlapping fashion over the collet member, thereby utilizing the ribbed surfaces to compress the collet member and place a tensile load on the compression ring to grip the outer surface of the shank member. In this manner, the linear fastener system is capable of providing a precise, secure, and reproducible connection between multiple components without the need to apply rotational torque to the assembly. The connection also allows full thread engagement and a locking connection without the need for plastic inserts or adhesives. When compared to traditional threaded fasteners, the dual ribbed compression surfaces allow very precise tensile loads to be applied to the shank member. Prior art designs require torque wrenches to apply measured clamping loads to fasteners. Linear compression of the collet member eliminates variations as seen in the prior art due to surface finish, lubrication and thread engagement to achieve a precise clamping load.

Accordingly, it is an objective of the present invention to provide a fastener system capable of precisely and reproducibly securing multiple components into a single assembly without the need to apply-torque to the assembly.

An additional objective of the present invention is to provide a fastener system capable of precise and reproducible linear engagement and disengagement.

It is a further objective of the present invention to provide a fastener system capable of providing precise and reproducible linear engagement to externally threaded surfaces and the like.

A still further objective of the present invention is to provide a fastener system capable of providing precise and reproducible linear engagement to snap ring grooves and the like.

Another objective of the present invention is to provide a fastener system capable of providing precise and reproducible linear clamping forces to a shank member.

Yet another objective of the present invention is to provide a fastener system suited for automated manufacturing and assembly.

Still yet another objective of the present invention is to provide a fastener system that allows close spacing and does not require wrench clearances.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 2 shows a section view of one embodiment of the instant invention illustrating the collet member with the compression ring in the first release position;

FIG. 3 shows a section view of the embodiment illustrated in FIG. 2 wherein the compression ring is moved into the second engaged position;

FIG. 13 shows linear coupling assembly of the instant invention.

FIG. 14 shows linear coupling assembly of the instant invention;

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
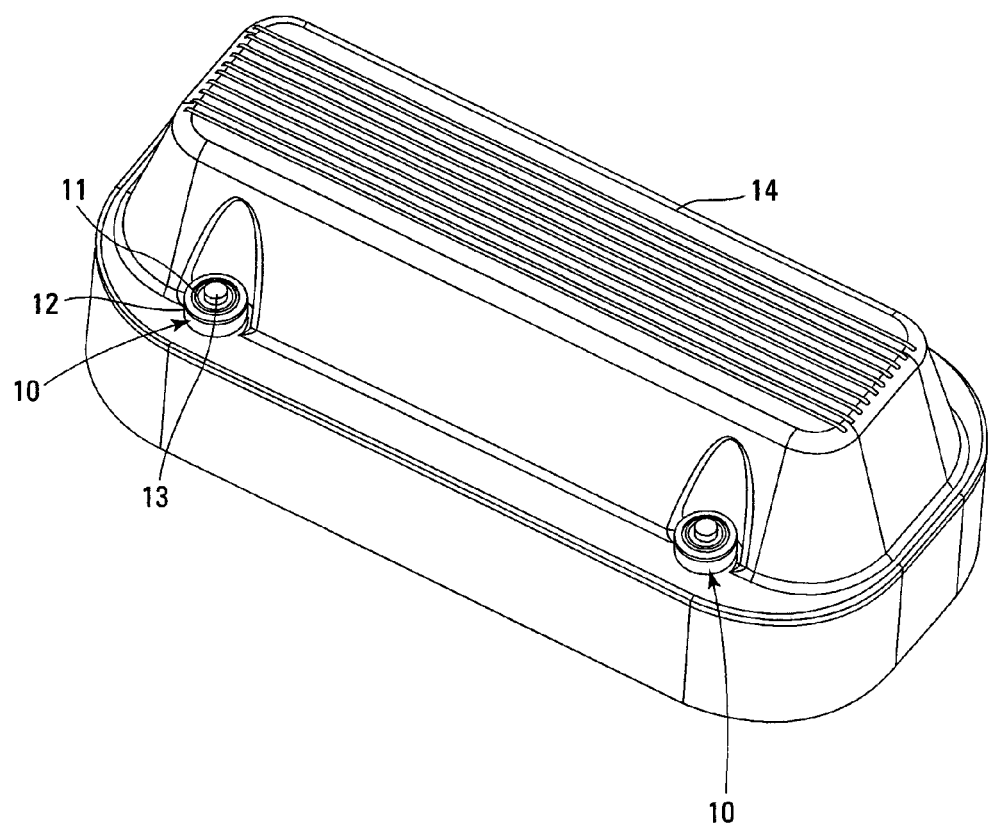
FIG. 1 shows a perspective view of one embodiment of the instant invention being utilized to secure an automotive valve cover.
Figure 6:
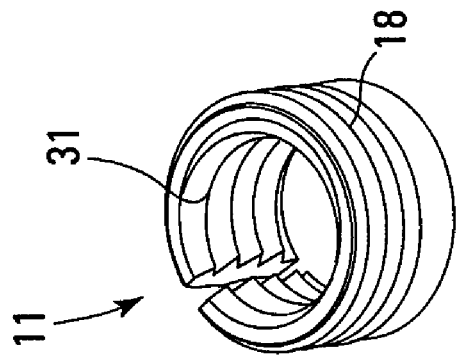
FIG. 6 shows a perspective view of one embodiment of the collet member of this invention.
Figure 5:
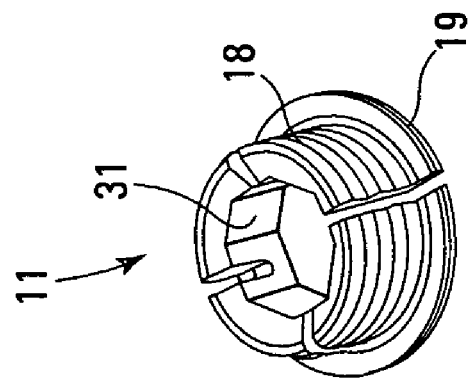
FIG. 5 shows a perspective view of one embodiment of the collet member of this invention.
Figure 4:
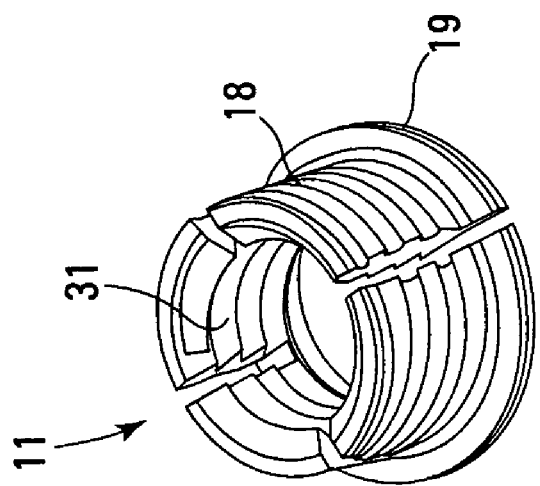
FIG. 4 shows a perspective view of one embodiment of the collet member of this invention.

The linear engaging fasteners 10 utilized to secure the automotive valve cover 14, shown in FIG. 1, are a representation of the general utility of the present invention. Referring to FIGS. 2 and 3, the linear fastener generally includes an axially aligned collet member 11 and a compression ring member 12 which are constructed and arranged to cooperate with a shank member 13. The external surface 18 of collet member 11 is constructed generally cylindrical with at least one and preferably three outwardly and circumferentially extending rib(s) 34 positioned about a central axis. Each rib 34 being constructed with a first ramp surface 36 to allow the compression ring to slide onto the rib and a second, ramp surface 38 to allow the compression ring to be removed from the collet member 11. The internal gripping surface 31 of collet member 11 is generally constructed and arranged to have a conjugate surface to the gripping surface 15 of the shank member 13 for cooperative engagement therebetween. The collet member 11 may also include a flared base 19 suitable to distribute clamping force over a wide area or provide a bearing surface for relative rotation of adjacent components. The collet member may be constructed of materials well known in the art which may include but should not be limited to steel, bronze, brass, copper, aluminum, plastic, ceramic, or rubber, as well as suitable combinations thereof.

Figure 9:
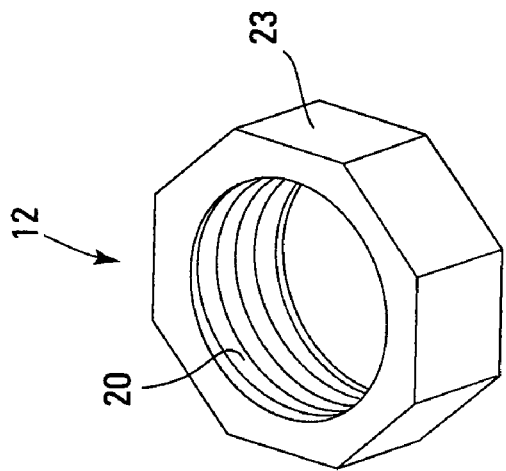
FIG. 9 shows a perspective view of one embodiment of the compression ring of this invention.
Figure 8:
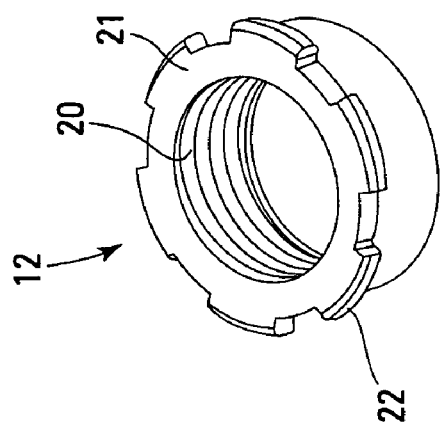
FIG. 8 shows a perspective view of one embodiment of the compression ring of this invention.
Figure 7:
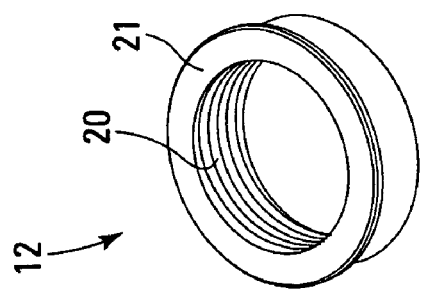
FIG. 7 shows a perspective view of one embodiment of the compression ring of this invention.

The compression ring 12, has a generally cylindrical interior surface 20 with at least one inwardly and circumferentially extending rib 40 arranged around a central axis to cooperate and coaxially align with the outwardly extending rib(s) 34 of the collet member 11. Each compression ring rib 40 being constructed with a first ramp surface 42 to allow the compression ring(s) to slide onto a respective collet rib and a second ramp surface 44 to allow the compression ring to be removed from a collet member 11. The compression ring 12 may be constructed with a flange 21 about the upper surface. The flange 21 may have optional lugs 22 (FIG. 8) formed in a C-shape for engaging an extractor (not shown) used to remove or disconnect the coupling. The flange may also have optional wrench flats 23 (FIG. 9) for engaging wrenches and/or sockets that are well known in the art.

Figure 12:
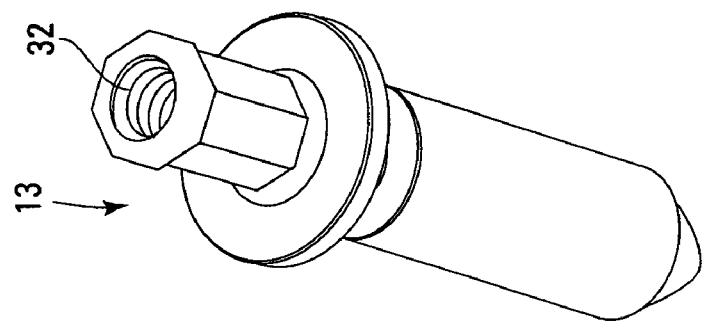
FIG. 12 shows a perspective view of one embodiment of the shank member of this invention.
Figure 11:
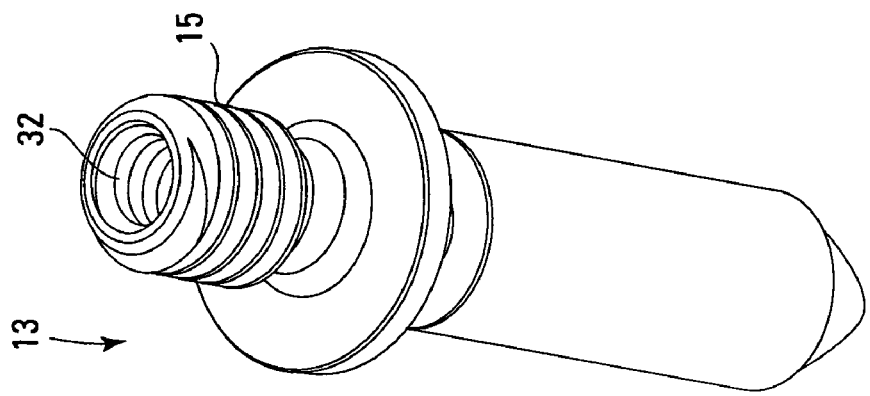
FIG. 11 shows a perspective view of one embodiment of the shank member of this invention.
Figure 10:
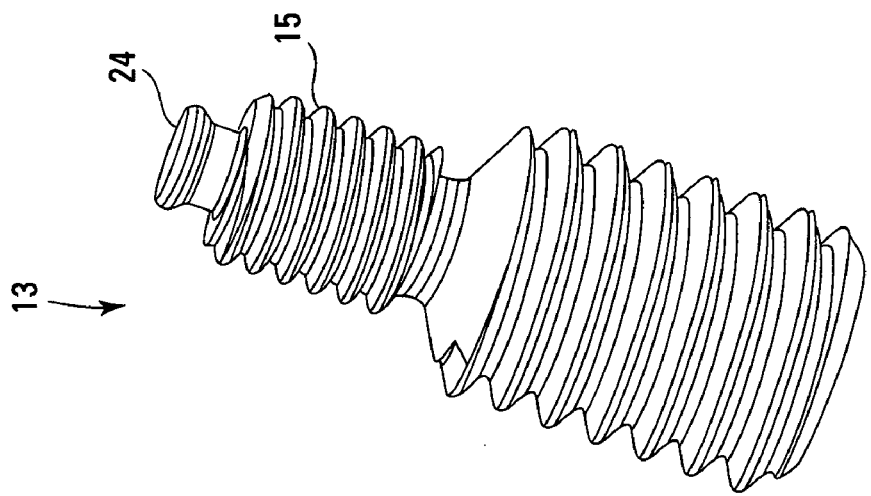
FIG. 10 shows a perspective view of one embodiment of the shank member of this invention.
Figure 18:
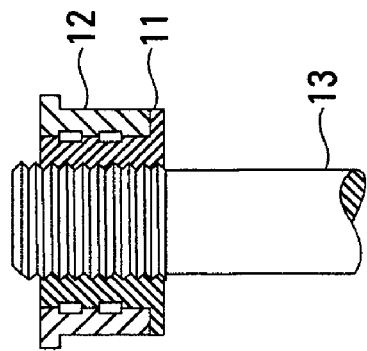
FIG. 18 shows a side view partially in section illustrating one embodiment of the present invention in cooperation with a threaded shank surface.
Figure 17:
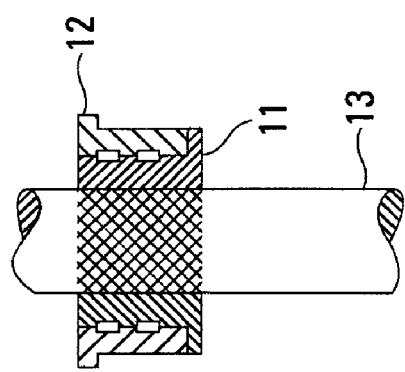
FIG. 17 shows a side view partially in section illustrating one embodiment of the present invention in cooperation with a knurled shank surface.
Figure 16:
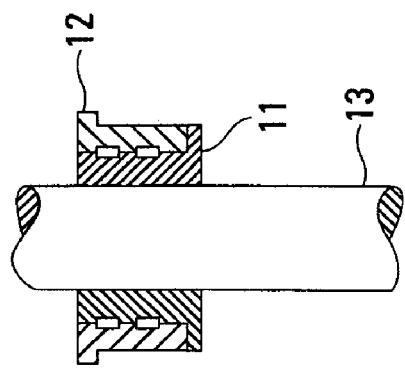
FIG. 16 shows a side view partially in section illustrating one embodiment of the present invention in cooperation with a generally smooth shank surface.
Figure 15:
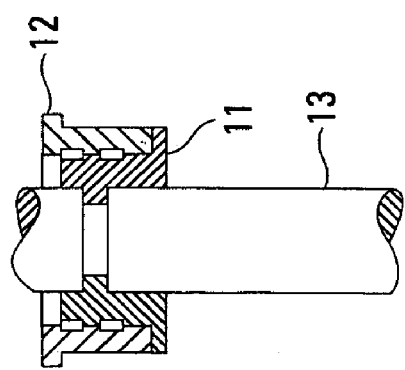
FIG. 15 shows a side view partially in, section illustrating one embodiment of the present invention in cooperation with a snap ring groove.

The shank member 13 is generally illustrated in FIGS. 10 through 12. The shank member includes an outer gripping surface 15 which is preferably round in shape, but may be oval, hex, d-shaped, square, rectangular or have other shapes well known in the art that are suitable for shank and/or shaft use. The outer gripping surface may also include any number of surface finishes well known in the art to enhance the gripping action between the shank member and the collet member, including but not limited to, threads, knurl, rings, snap ring grooves, generally smooth or tapered surface, or suitable combinations thereof, as well as other surfaces suitable for providing adequate grip to secure an assembly.

The ribbed construction of the outer surface of the collet member and inner surface of the compression ring allow the two components to be interlocked into a coaxially aligned sub-assembly prior to assembly to a shank member. In operation, the compression ring and collet sub-assembly 50 (FIG. 2), is slid or loosely threaded over the external gripping surface 15 of a shank member 13. As the interlocking sub-assembly 50 contacts the components being assembled the wedging action of the threads forces the collet open until the outer surface of the ribs 34 are forced against the inner surface 52 of the compression ring 12. This construction allows precise clamping forces to be applied to an assembly as the compression ring 12 is linearly traversed with respect to the collet member 11 and the interaction between the threads and the inner surface of the: collet member exert a tensile load on the shank member 13. The construction also allows full surface engagement between the gripping surface 15 of the shank member 13 and the internal gripping surface 31 of the collet member 11, and facilitates a locking connection without plastic inserts or adhesive.

FIGS. 13 and 14 show non-limiting alternative methods of securing the linear fastener 10 to a shank member. In FIG. 13, the collet member 11 can be slid or loosely threaded onto the gripping surface 15 of the shank member, illustrated herein having exterior threads. The relationship between the threads on the shank and the collet are constructed and arranged to cause a tensile load on the shank member when the collet is compressed. The shank member may also include an optional tensioning means constructed and arranged to allow a predetermined amount of clamping force to be applied to the components or tension applied to the shank member prior to engaging the collet member with the compression ring member. The optional tensioning means is illustrated herein in a non-limiting embodiment as an internal bore 32 which includes internal threads 28. The internal bore is constructed and arranged to cooperate with a tension rod 25. The tension rod includes external threads 26 which are threaded into the internal threads 28 of the shank member. The external threads 26 engage internal threads 28 of the shank member to apply a predetermined amount of clamping force to the component(s)

23 prior to engaging the compression ring 12 over the collet member 11. The ribbed inner surface 20 of the compression ring 12 is frictionally engaged with the ribbed outer wall 18 of the collet member 11. The linear compression coupling results from equal and opposite forces, A and B, shown in FIGS. 13 and 14, being applied to the compression ring and the collet member, simultaneously. Once the collet member is collapsed to the shank member the compression ring is tensilely loaded to maintain the compression force, resulting in a connection that is resistant to undesired loosening.

Figure 19:
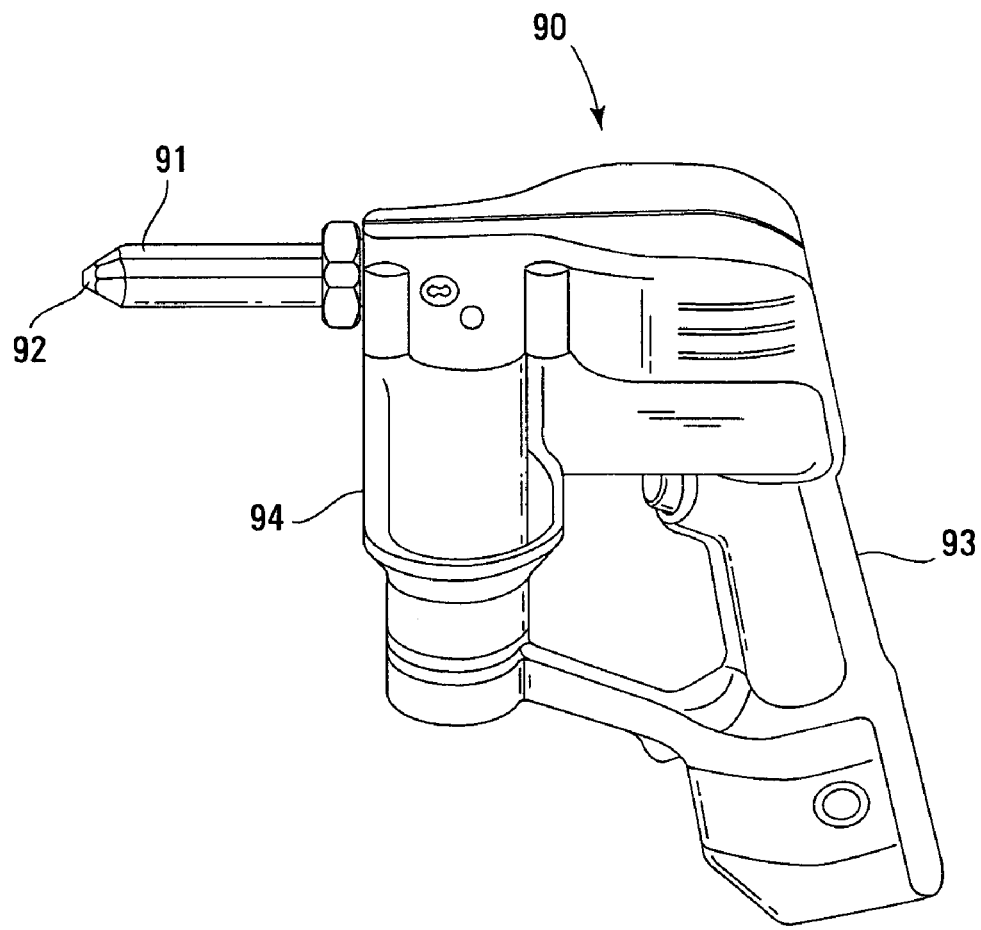
FIG. 19 shows an implement for applying linear compression.

FIG. 13 shows an alternative tension means for applying a predetermined amount of clamping force to a component, wherein the shank member 13 includes a tip 24 constructed and arranged to be grasped by an assembly tool 90 (FIG. 19). Other alternative tension means suitable for grasping the shaft member to apply a predetermined amount of clamping force to the components prior to engaging the linear fastener may include but should not be limited to frangible stems, internal or external grooves, cross drilled apertures, internal bores and flats as well as other suitable means well known in the art.

In FIGS. 15 through 18, final assembly of the collet member 11 and the compression ring 12 are shown engaging various outer gripping surfaces 15 of shank members 13.

FIG. 19 shows an instrument having a pistol grip 93, a power source 94 and concentric pistons 91 and 92. Piston 92 is sized to grip the tension rod. Piston 91 is sized to seat on the compression ring. As the instrument 90 applies progressive pressure through concentric pistons 91 and 92, the compression ring 12 moves downwardly reducing the diameter of the collet member 11 and tensilely loading the compression ring through the interaction of the complementary ribbed surfaces. The interior gripping surface of the collet member tightly engages the external gripping surface of the shank to provide a locking relationship. Once all slack is taken out of the linear coupling, the extension rod may be constructed to break at the limit of optimum pressure. Alternatively, the instrument 90 may have a gauge for setting the desired pressure wherein the shank member is released after compression.

In the event that a linear fastener must be removed, a similar instrument may be employed. One of the pistons would have a flange with flat lugs. The instrument would be placed over the compression ring and turned to engage the flat lugs and opposite force is applied to remove the compression ring from the collet member. The linear coupling is separated without placing pressure on the fastened components.

Figure 22:
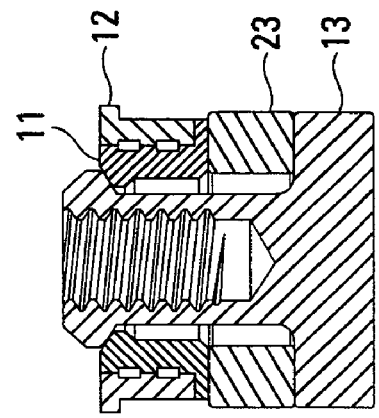
FIG. 22 shows a section view of the embodiment shown in FIG. 18 illustrating the linear fastener in the second engaged position.
Figure 21:
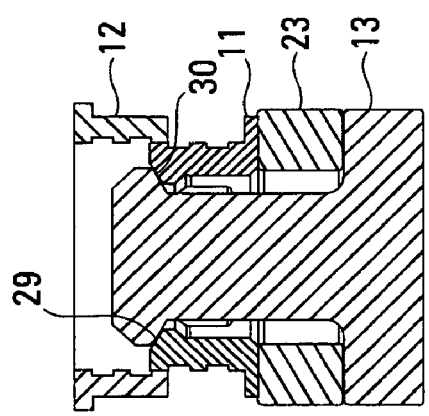
FIG. 21 shows a section view of the embodiment shown in FIG. 18 illustrating the linear fastener in the first release position.
Figure 20:
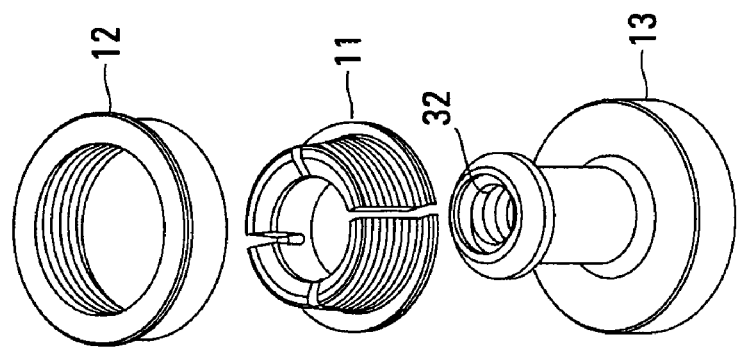
FIG. 20 shows a perspective exploded view of an alternative embodiment of the present invention.

FIGS. 20 through 22 show an alternative embodiment of the present invention wherein progressive linear engagement of the compression ring over the collet member applies tension to the shank member as it ramps upwardly on the collet member. In this embodiment the shank member includes at least one conical or angled surface 29 which cooperates with a conjugate surface 30 within the collet member 11.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A precise linear fastener system comprising:
   a collet member having a base end, a top end, an inner engaging surface, and an outer ribbed surface, said outer ribbed surface including at least one peak and at least one valley each extending non-helically about said outer ribbed surface, each said at least one peak and said at least one valley positioned on an independent plane that is substantially perpendicular to a central axis;
   a compression ring member having a base end, a front end, an inner ribbed surface complementary to said at least one peak and said at least one valley of said outer ribbed surface of said collet member, and an outer surface positioned about said central axis;
   said inner ribbed surface of said compression ring member being constructed and arranged for coaxial alignment and overlapping engagement with respect to said outer ribbed surface of said collet member, said compression ring member linearly traversable with respect to said outer ribbed surface of said collet member between a first release position and a second engaged position, wherein said engaged position results in said outer ribbed surface of said collet member and said inner ribbed surface of said compression ring compressing said collet member and tensilely loading said compression ring member which is adapted to engage a shank member having an outer gripping surface and wherein said release position results in said at least one peak of said collet member being disposed in said at least one valley of said compression ring for expansion of said collet member which is thereby adapted to release said outer gripping surface of a shank member.

2. The precise linear fastener system of claim 1 wherein said shank member includes a first end and a second end.

3. The precise linear fastener system of claim 1 wherein said ribbed outer surface of said collet member includes at least one outwardly and circumferentially extending rib, each said rib including a first ramp surface to facilitate coaxially aligned linear overlapping movement of said compression ring in relation to said collet member for engagement thereof, and a second ramp surface to facilitate linear removal of said compression ring from said collet member.

4. The precise linear fastener system of claim 1 wherein said inner engaging surface of said collet member is constructed and arranged with a conjugate shape in relation to said outer gripping surface of said shank member.

5. The precise linear fastener system of claim 1 wherein said inner engaging surface of said collet member is constructed and arranged with internal threads.

6. The precise linear fastener system of claim 1 wherein said first end of said shank member includes a tensioning means, said tensioning means being constructed and arranged to allow said shank member to be tensilely loaded prior to linear traversal of said compression ring member into said engagement position with respect to said collet member.

7. The precise linear fastener system of claim 6 wherein said shank member tensioning means includes at least one internal bore extending inwardly from said first end of said shank member along the longitudinal centerline of said shank member, wherein said at least one internal bore is constructed and arranged for gripping and placing a tensile load on said shank member prior to linear traversal of said compression ring member into said engagement position with respect to said collet member.

8. The precise linear fastener system of claim 1 wherein said outer ribbed surface of said coller member and said inner ribbed surface of said compression ring member are constructed and arranged to maintain an axially aligned interfitting relationship in said release position.

9. The precise linear fastener system of claim 1 wherein said collet member is constructed of plastic.

10. The precise linear fastener system of claim 1 wherein said collet member is constructed of copper.

11. The precise linear fastener system of claim 1 wherein said collet member is constructed of brass.

12. The precise linear fastener system of claim 1 wherein said collet member is constructed of bronze.

13. The precise linear fastener system of claim 1 wherein said collet member is constructed of aluminum.

14. The precise linear fastener system of claim 1 wherein said collet member is constructed of steel.

15. The precise linear fastener system of claim 1 wherein said collet member is constructed of rubber.

16. A precise linear fastener system comprising:
a collet member having a base end, a top end, an inner engaging surface, and an outer ribbed surface positioned about a central axis, said outer ribbed surface including at least one peak and at least one valley, each of said at least one peak and said at least one valley constructed and arranged to extend non-helically around said outer ribbed surface each on an independent plane that is substantially perpendicular to said central axis; and
a compression ring member having a base end, a front end, an inner ribbed surface defining peaks and valleys having the same shape as the peaks and valleys of said outer ribbed surface so as to be complementary to said peaks and valleys of said outer ribbed surface of said collet member, and an outer surface positioned about a central axis;
said inner ribbed surface of said compression ring member being constructed and arranged for coaxial alignment and overlapping engagement with respect to said outer ribbed surface of said collet member, said compression ring member linearly traversable with respect to said outer ribbed surface of said collet member between a first release position and a second engaged position, wherein said engaged position results in said outer ribbed surface of said collet member and said inner ribbed surface of said compression ring compressing said collet member and tensilely loading said compression ring member to engage a shank member having an outer gripping surface whereby said collet member is clamped to the shank member, and wherein said release position results in said peaks of said collet member being entirely disposed in said valleys of said compression ring for expansion of said collet member thereby releasing the outer gripping surface of the shank member;

wherein said first end of said shank member includes a tensioning means, said tensioning means being constructed and arranged to allow said shank member to be tensilely loaded prior to linear traversal of said compression ring member into said engagement position with respect to said collet member;
wherein said shank member tensioning means includes at least one internal bore extending inwardly from said first end of said shank member along the longitudinal centerline of said shank member, wherein said at least one internal bore is constructed and arranged for gripping and placing a tensile load on said shank member prior to linear traversal of said compression ring member into said engagement position with respect to said collet member; and
wherein said internal bore includes internal threads.

17. A linear fastener system, comprising:
a collet member including an outer ribbed surface, said outer ribbed surface including at least one peak and at least one valley, each of said at least one peak and said at least one valley constructed and arranged to extend non-helically around said outer ribbed surface each on an independent plane that is substantially perpendicular to said central axis, and an inner surface adapted to grip a corresponding surface of a shank in a locked condition of said fastener system; and
a compression ring including an inner ribbed surface defining at least one peak and at least one valley corresponding to said at least one peak and valley of said collet member;
the linear fastener system having a locked condition wherein said at least one peak of said collet member and said at least one peak of said compression ring are in confronting alignment, and an unlocked condition wherein said at least one peak of said collet member disposed in said at least one valley of said compression ring, whereby said collet member is adapted to grip a shank in said locked condition without rotating said collet member.

18. A precise linear fastener system comprising:
a collet member having opposite first ends with a shank receiving first bore at least partially defined by an inner shank engaging surface, said collet member also including a outer first surface with at least one outwardly extending first rib and at least one first groove facing generally outwardly, said collet member having a longitudinal central axis, said at least one first rib extending about said outer surface non-helically and at least one said first rib and at least one said first groove extending about said first surface each in an independent plane substantially perpendicular to said central axis; and
a compression ring member having opposite second ends and a collet member receiving second bore defined by a collet member engaging inner second surface, said second surface including at least one inwardly extending second rib and at least one second groove facing generally inwardly, at least one of the first and second ribs being selectively receivable in a respective said second or first groove in a release position and at least one said first rib and a respective at least one said second rib being in confronting alignment in a lock position effecting radial compression of the collet member and tensile loading of the compression member to effect engagement of the inner shank engaging surface with a shank.

19. The precise linear fastener system of claim 18 wherein the first bore is a thru bore.

20. The precise linear fastener system of claim 18 wherein the second bore is a thru bore.

21. The precise linear fastener system of claim 18 including a shank member positioned in the first bore.

22. The precise linear fastener system of claim 21 wherein a first end of said shank member includes a tensioning means, said tensioning means being constructed and arranged to allow said shank member to be tensilely loaded prior to linear traversal of said compression ring member into said lock position.

23. The precise linear fastener system of claim 18 wherein said first surface of said collet member including a first ramp surface extending between an adjacent said rib and said groove to facilitate coaxially aligned linear overlapping movement of said compression ring relative to said collet member between the release position and the lock position.

24. The precise linear fastener system of claim 18 wherein said inner shank engaging surface of said collet member being constructed and arranged with internal threads.

25. The precise linear fastener system of claim 18 wherein there being a plurality of said first ribs and a plurality of said second ribs.

26. A precise linear fastener system comprising:
   a collet member with a shank receiving first bore lying along a longitudinal central axis of the collet member and including an outer ribbed first surface with at least one outwardly and circumferentially extending first rib and at least one outwardly opening and circumferentially extending first groove, said at least one first rib and first groove extending non-helically around the first surface each in an independent plane generally perpendicular to said central axis, said first bore being at least partially defined by a shank engaging surface;
   a compression ring including an inner ribbed surface at least partially defining a second bore, said collet member being at least partially received in said second bore, said second bore having an inner ribbed second surface having at least one second rib and at least one second groove whereby when the first and second ribs are in interfering contact, said collet member being radially compressed to provide a locked position and when not in interfering contact providing a release position; and
   a shank positioned in the first bore and sized and shaped to be retained in the first bore by engagement with at least a portion of the shank engaging surface when the collet member and compression ring are in the locked position.

27. The precise linear fastener system of claim 26 wherein said first surface of said collet member including a first ramp surface extending between an adjacent said first rib and said first groove to facilitate coaxially aligned linear overlapping movement of said compression ring relative to said collet member between the release position and the lock position.

28. The precise linear fastener system of claim 27 wherein there being a plurality of said first ribs and a plurality of said second ribs.

* * * * *